(12) United States Patent
Jagiella

(10) Patent No.: US 10,955,307 B2
(45) Date of Patent: Mar. 23, 2021

(54) INLINE SENSOR AND FLUID LINE SYSTEM

(71) Applicant: Endress+Hauser Conducta GmbH+Co. KG, Gerlingen (DE)

(72) Inventor: Manfred Jagiella, Notzingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/227,925

(22) Filed: Dec. 20, 2018

(65) Prior Publication Data

US 2019/0195717 A1 Jun. 27, 2019

(30) Foreign Application Priority Data

Dec. 22, 2017 (DE) ...................... 10 2017 131 076.2

(51) Int. Cl.
| | |
|---|---|
| *F16K 31/02* | (2006.01) |
| *G01L 19/00* | (2006.01) |
| *G05D 16/02* | (2006.01) |
| *G05D 16/20* | (2006.01) |

(52) U.S. Cl.
CPC ...... *G01L 19/0092* (2013.01); *G01L 19/0038* (2013.01); *G05D 16/02* (2013.01); *G05D 16/2013* (2013.01)

(58) Field of Classification Search
CPC . G01L 19/0092; G01L 19/0038; G05D 16/02; G05D 16/2013
USPC ............ 137/487.5, 552, 551, 553, 557, 883, 137/565.26, 597; 73/708, 723, 733, 1.57, 73/31.05, 31.06, 54.38, 64.51, 665, 768, 73/774, 807, 811, 862.581, 204.22, 756
See application file for complete search history.

(56) References Cited

U.S. PATENT DOCUMENTS

| | | | | |
|---|---|---|---|---|
| 5,412,616 A | * | 5/1995 | Gonzalez | ........... G05D 16/2013 367/13 |
| 6,003,379 A | * | 12/1999 | Ichikawa | ............ G01L 19/0092 73/708 |
| 8,487,387 B2 | * | 7/2013 | Lin | .......................... B81B 7/02 257/415 |
| 9,176,089 B2 | * | 11/2015 | Le Neel | .................... G01K 7/01 |
| 9,586,815 B2 | * | 3/2017 | Su | .............................. B81B 7/02 |
| 9,617,144 B2 | * | 4/2017 | Tsai | ...................... B81C 1/0023 |
| 2005/0005969 A1 | | 1/2005 | Wu et al. | |
| 2006/0208876 A1 | * | 9/2006 | Kirchner-Gellert | ..... H04Q 9/00 340/539.1 |

(Continued)

FOREIGN PATENT DOCUMENTS

| | | |
|---|---|---|
| CN | 101553714 A | 10/2009 |
| CN | 107076570 A | 8/2017 |

*Primary Examiner* — Minh Q Le
(74) *Attorney, Agent, or Firm* — Kelly J. Smith; Endress+Hauser (USA) Holding Inc.

(57) ABSTRACT

The present disclosure relates to an inline sensor including a housing fixable in a wall of a fluid line or a process container. A first transducer for detecting a primary measurand of a medium contained in the fluid line or the process container is integrated into the housing and designed to generate first measurement signals dependent on the primary measurand. A sensor electronics is connected to the first transducer for detecting the first measurement signals and designed to process the first measurement signals. The inline sensor is additionally designed to detect pressure surges occurring in the process container.

13 Claims, 3 Drawing Sheets

(56) References Cited

U.S. PATENT DOCUMENTS

| | | | |
|---|---|---|---|
| 2007/0144247 A1* | 6/2007 | Seesink | G01L 9/125 |
| | | | 73/146.3 |
| 2007/0289380 A1* | 12/2007 | Lin | G01L 19/0046 |
| | | | 73/493 |
| 2008/0072877 A1* | 3/2008 | Kurtz | G01L 19/0092 |
| | | | 123/406.55 |
| 2009/0007968 A1* | 1/2009 | Knecht | G01M 3/2807 |
| | | | 137/15.11 |
| 2010/0284437 A1* | 11/2010 | Stoll | G01K 13/02 |
| | | | 374/143 |
| 2014/0166115 A1 | 6/2014 | Yang | |
| 2015/0046125 A1* | 2/2015 | Jagiella | G06K 7/1404 |
| | | | 702/184 |
| 2015/0192478 A1* | 7/2015 | Rueth | G01K 1/14 |
| | | | 374/143 |
| 2016/0004956 A1* | 1/2016 | Reynolds | A61L 2/07 |
| | | | 377/15 |
| 2016/0091382 A1* | 3/2016 | Haywood | G01L 19/0092 |
| | | | 73/723 |
| 2017/0160228 A1* | 6/2017 | Pechstein | G01N 27/4167 |
| 2017/0241841 A1* | 8/2017 | Gueguen | G01K 1/14 |
| 2017/0285665 A1 | 10/2017 | Nunally et al. | |
| 2018/0180502 A1* | 6/2018 | Kim | G01L 19/0092 |
| 2018/0192167 A1* | 7/2018 | Lange | G05D 23/1919 |
| 2018/0231427 A1* | 8/2018 | Tasaki | G01L 19/0092 |
| 2019/0044166 A1* | 2/2019 | Le Gonidec | G05D 16/2013 |
| 2019/0101466 A1* | 4/2019 | Dennison | G01F 1/684 |
| 2019/0293467 A1* | 9/2019 | Sorenson | G01L 19/0092 |
| 2020/0072685 A1* | 3/2020 | Diez Garcia | G01L 1/20 |

* cited by examiner

INLINE SENSOR AND FLUID LINE SYSTEM

CROSS-REFERENCE TO RELATED APPLICATION

The present application is related to and claims the priority benefit of German Patent Application No. 10 2017 131 076.2, filed on Dec. 22, 2017, the entire contents of which are incorporated herein by reference.

TECHNICAL FIELD

The present disclosure relates to a fluid line system and an inline sensor which can be integrated into a fluid line.

BACKGROUND

Fluid line systems can form a gas or liquid line network, e.g., a gas or drinking water supply network. A fluid is understood herein to mean a flowable medium, for example a liquid, a liquid mixture, a dispersion or suspension, a gas or, as applicable, a gas or gas mixture comprising an aerosol. Fluid line systems may also be components of a process plant in the process industry. In this case, process fluids, for example process liquids or process gases, are transported in the fluid lines. The process fluids can be used, for example, to produce a process product, for example a medicinal agent, a food product or a chemical product. Process fluids can also be liquids to be treated, e.g., water to be processed, or reagents used in such a treatment process. Process fluids may also be cleaning or disinfecting agents for cleaning the fluid line system, which are flushed through the fluid line system prior to commencement of a new process cycle. Additional process fluids may include oil or oil/water mixtures, which occur in the field of oil delivery/oil preparation or in oil supply pipelines.

Pumps or means for generating an overpressure or negative pressure in the fluid lines in interaction with valves are used to transport fluids through a fluid line system. As used herein, a valve refers to any type of blocking element, for example isolation valves, plug valves or other valves of various types, which are used to optionally, i.e., depending on the position of the blocking element, block or unblock a fluid transport through a fluid line. Depending on the application of the fluid line system, these valves can be actuated manually or automatically by means of a controller. In this latter case, the valves comprise actuators that can be actuated by the controller and that convert electrical signals of the controller into mechanical movements of the valves. In order to monitor the quality and quantity of the fluids transported through the fluid lines, inline sensors can be integrated into the fluid lines. These sensors can be connected to a controller possibly provided for actuating the valves in order to provide measurement data to the controller. The controller may be designed to use the measurement data to control or regulate the fluid transport through the fluid line system and also, for example, for the purpose of controlling or regulating a process in a process plant to which the fluid line system belongs.

Such inline sensors are, for example, temperature sensors, level sensors, flow sensors and analysis sensors. In addition to the transducer, which produces measurement signals that are dependent on the measurand, the inline sensors comprise a measuring electronics that determines measured values of the measurand from the measurement signals. The measuring electronics can be designed, for example, as a transmitter connected to the transducer or a measuring transducer. The transmitter or transducer usually comprises an interface, where the transmitter or transducer can output the determined measured values according to a standard communication protocol to a higher-level unit, e.g., a controller as the one mentioned above. A measuring transducer can have a housing with display and input means, for example, in the form of a display, input keys or switches.

An analysis sensor generally comprises a transducer designed to generate a measurement signal dependent on an analysis measurand. For example, the measurement signal may be dependent on a concentration of at least one analyte in a measuring fluid. An analyte is a substance or several substances that are contained, or dissolved, in the measuring medium and whose concentration in the measuring fluid is to be determined and/or monitored by means of the analysis sensor.

Examples of level sensors are vibration sensors or level sensors based on capacitance or conductivity measurements. Examples of flow sensors are magnetically inductive flow sensors, mass flow sensors based on the Coriolis principle, ultrasonic flow sensors, thermal flow sensors or vortex flow sensors. Examples for analysis sensors are conductivity sensors, such as conductive or inductive conductivity sensors, density and viscosity sensors, pH sensors, ion-selective electrodes, dissolved oxygen sensors, turbidity sensors, gas sensors, photometric sensors that are designed to determine a concentration of a substance present in a photometric measuring path based on a photometric absorption measurement, or spectrometers, such as Raman spectrometers or NIR spectrometers. Analysis sensors designed as inline sensors have a housing integrated into a fluid line. The transducer of these sensors is integrated into the housing so that it can detect a measurand of a fluid contained in the fluid line or flowing through the fluid line, generally in contact with the fluid. The measuring electronics with measuring transducer or transmitter function can be located in a common housing with the transducer, or can be located remotely and connected to the transducer via a cable.

In fluid line systems, pressure surges, i.e., surge-like increases occurring over a short period of time of the pressure prevailing in the fluid line system, are a common cause of damage. Pressure surges are also referred to as pressure shocks. The fluid lines themselves, and also valves, floats, actuators or fittings, can be damaged by such pressure surges. Pressure surges typically occur due to cavitation or when valves or fittings in the line system are actuated too quickly and/or in a non-synchronized manner. As a rule, it is impossible to detect such pressure surges at an early stage or to even systematically monitor them. Damage, therefore, is frequently detected only symptomatically, for example when a malfunction is present, or during the course of routine maintenance work on the fluid line system.

SUMMARY

It is the object of the present disclosure to enable the registration and/or monitoring of pressure surges occurring in a fluid line system. The inline sensor, according to the present disclosure, comprises a housing fixable in a wall of a fluid line or of a container, and a first transducer for detecting a primary measurand of a medium contained in the fluid line or the container. The first transducer is integrated into the housing and designed to generate first measurement signals dependent on the primary measurand. A sensor electronics is connected to the first transducer for detecting the first measurement signals and designed to process the first measurement signals. The inline sensor is additionally designed to detect pressure surges occurring in the fluid line or the container.

In fluid lines or in containers of the fluid line systems described above, inline sensors are frequently provided in order to monitor and, if necessary, control or regulate the fluid transport or fluid measurands, e.g., the fluid composition. By designing such a line sensor itself to detect pressure surges or pressure shocks in addition to the primary measurand, no additional connection for a further sensor for detecting pressure surges or pressure shocks, e.g., an additional pressure sensor, is needed. This allows simple installation for pressure surge monitoring and simple retrofitting for fluid line systems in already existing plants, since, for pressure surge or pressure shock monitoring, the already existing measuring points and communication infrastructure, which is already provided anyway for monitoring fluid measurands, may be used for pressure surge monitoring.

In order to detect pressure surges, the inline sensor can have a second transducer, for detecting a secondary measurand, that is integrated into the housing and designed to generate second measurement signals dependent on the secondary measurand, where a pressure change acting on the housing, such as a pressure surge, influences the secondary measurand. By integrating the second transducer for detecting a secondary measurand reflecting the pressure surge into the housing of the inline sensor, only a single mechanical connection to the fluid line is required in order to both monitor the primary measurand and detect and register pressure surges.

The second transducer can be, for example, a pressure sensor, an acceleration sensor, e.g., a 3D acceleration sensor, a strain gauge, or a position sensor, e.g., a capacitive position sensor. A GPS sensor as a satellite-supported position sensor or a magnetometer can also be used as a position sensor. In addition to the readily available 3D acceleration sensors that are suitable for the purpose according to the present disclosure, capacitive acceleration sensors or acceleration sensors operating according to the piezo effect can also be used as acceleration sensors.

In an advantageous embodiment, the second transducer can be a MEMS (microelectromechanical system) sensor, for example a MEMS pressure sensor or a MEMS acceleration sensor. Such sensors have only a small space requirement and can advantageously be arranged in or on the wall of housings of conventional inline sensors.

The sensor electronics can be arranged at least partially in the housing comprising the first transducer. In one possible embodiment, it can be arranged completely in this housing. Alternatively, it can be divided into a first part of the sensor electronics integrated into the housing comprising the first transducer and a second part of the sensor electronics arranged in a second housing, such as a housing remote from the housing comprising the first transducer. The second part of the sensor electronics can be connected wirelessly by radio or via an inductive, capacitive or optical coupling and/or cable-connected to the first part of the sensor electronics.

The second transducer may, for example, be integrated into the housing in such a way that it is arranged and fixed within a chamber formed in the housing or in or on a wall of the housing. For example, a strain gauge, an acceleration sensor, or a position sensor may be fixed to an inner or outer side of the wall of the housing or may be encapsulated, e.g., cast or injected, inside the wall. If the line sensor is a potentiometric sensor with a reference electrode, the second transducer can be arranged within a chamber serving as a reference electrode housing within the housing and communicating with the fluid line via a transfer, e.g., a gap or a diaphragm, so that pressure surges occurring in the fluid line can also be detected within the chamber.

In embodiments in which at least a part of the sensor electronics is arranged in the housing of the inline sensor, an electronics chamber sealed against the penetration of liquid and/or moisture can be formed in the housing. The electronics chamber can, for example, be part of a sensor plug head which can be mechanically coupled as a first coupling part to a second, complementary coupling part in order to form a plug connection. The second coupling part can, in this embodiment, be connected via a cable to a further part of the sensor electronics or a higher-level data processing unit, so that the plug connection at the same time establishes a connection of all or parts of the sensor electronics to the higher-level data processing unit. The plug connection can establish either a galvanic contact or an inductive, capacitive or optical coupling between the parts of the sensor electronics connected via the plug connection or the sensor electronics and the higher-level data processing unit. This permits an exchange of energy and data via the plug connection. In these embodiments, the second transducer may be arranged in the electronics chamber, such as in the sensor plug head or in a coupling part of the plug connection complementary to the sensor plug head, which plug connection connects the parts of the sensor electronics to one another or the sensor electronics to the higher-level data processing unit.

The sensor electronics can be connected to the second transducer for detecting the second measurement signals and can be designed to process, for example digitize and output, the second measurement signals. It is advantageous in this embodiment of the sensor according to the present disclosure that the sensor electronics is configured to detect and further process measurement signals of both the first and second transducer. This allows configuring the sensor electronics such that it outputs the processed measurement signals via a communication interface, such as a single communication interface, which may be designed to communicate with a higher-level data processing unit, e.g., a measuring transducer or an operating device, in a wired or wireless manner. For example, the measurement signals and/or the processed measurement signals can be output via a single cable to a higher-level transducer, which in turn supplies the inline sensor with energy via the same cable.

The primary measurand can be an analysis measurand of a measuring fluid contained in the fluid line or the container, a mass or volume flow of the measuring fluid through the fluid line or the container, a temperature of the measuring fluid in the fluid line or the container, or a fill level of the measuring fluid in the fluid line or the container. An analysis measurand is understood here to mean a measurand that depends on a concentration of at least one analyte in a measuring fluid. As an analysis measurand, the primary measurand can, for example, be a concentration of a single analyte, e.g., an ion concentration, a concentration of a gas, e.g., oxygen, a pH value, a conductivity, a turbidity or a particle or gas bubble concentration, a redox potential or a sum parameter, such as a spectral absorption coefficient (SAC), or a chemical oxygen requirement of the measuring fluid.

As already mentioned, the sensor electronics can be connected to a higher-level data processing unit in a wireless or wired manner for communication, the sensor electronics being designed to communicate with the higher-level data processing unit, such as to output to the higher-level data processing unit the first and second measurement signals or signals comprising information derived from the first and second measurement signals. A connection of the sensor electronics to the higher-level data processing unit can be established, for example, in a detachable manner by means of a plug-in connector coupling that mechanically and electrically connects the sensor electronics to the higher-level data processing unit. The plug-in connector coupling can comprise two detachably interconnectable coupling elements, e.g., a plug and socket, which in the connected condition are connected to each other either by galvanic contacts or by an inductive, capacitive or optical coupling for transmitting power and data. The higher-level data processing unit may be a measuring transducer, a controller or a portable operating device, for example a portable computer, a smartphone, a smartwatch, a tablet or some other smart device. In one embodiment, the higher-level data processing unit can supply the sensor electronics with energy.

The sensor electronics may be configured to determine measured values of the primary measurand in the physical unit of the primary measurand from the first measurement signals, i.e., the signals representing the primary measurand and to display and/or output them via a communication interface of the sensor electronics. If the sensor electronics is connected to a higher-level data processing unit, it can output the measured values to the higher-level data processing unit. In an alternative embodiment, the sensor electronics can be configured to output the first measurement signals or the processed, e.g., amplified and/or digitized, first measurement signals via the communication interface to the higher-level data processing [unit], for example. In this embodiment, the higher-level data processing unit can be configured to determine measured values of the primary measurand in the physical unit of the primary measurand from the first measurement signals received and optionally processed by the sensor electronics. In both embodiments, the measured values are determined from the measurement signals on the basis of a calibration function, wherein parameters of the calibration function (e.g. zero point and slope of a calibration line) can be stored in a memory of the sensor electronics and/or in a memory of the higher-level data processing unit.

The sensor electronics and/or the higher-level data processing unit can moreover be configured to analyze the second measurement signals, for example a temporal course of sequentially detected second measurement signals, in order to detect a pressure surge. This pressure surge detection can be carried out either completely by the sensor electronics or completely by the higher-level data processing unit, or individual process steps can be performed by the sensor electronics and individual process steps can be performed by the higher-level data processing unit. According to the intended division, the sensor electronics and/or the higher-level data processing unit comprises analysis software, which can be executed by the sensor electronics or the higher-level data processing unit in order to detect a pressure surge from the temporal course of the second measurement signals.

The analysis software can include an algorithm for classification or detection of the pressure surges from the course of the second measurement signals. For example, the analysis software can include a method for detecting a pressure surge based on a change in the second measurement signals within a predetermined short time span or based on a derivative of the temporal course of the second measurement signals. This can be done by comparison with at least one corresponding temporal course expected during a pressure surge, with at least an expected change in the second measurement signals within the predetermined time span or with at least one expected derivative of the second measurement signals. These expected data can be determined by preliminary tests and stored in a memory of the sensor circuit. The algorithm may alternatively or additionally also be configured to detect pressure surges based on one or more threshold value comparisons. If, for example, the change of the second measurement signals or a derivative of the temporal course of the second measurement signals is monitored within a predetermined short time span, the change or derivative can be compared with a predefined threshold value. Exceeding this threshold value may trigger an identification and registration of a pressure surge. The analysis software may alternatively or additionally comprise classifier algorithms for detecting the pressure surges from the course of the second measurement signals.

If the second transducer is not in direct contact with the fluid contained in the fluid line or container, e.g., when it is arranged within the housing of the sensor, it detects the pressure course occurring in the fluid line or the container not directly but only in a mediated manner via parts of the housing and, where applicable, via fluids contained in the housing. This can attenuate and/or distort the pressure course, so that the measurement signals of the second transducer reflect the actual pressure course occurring in the fluid line or in the container no longer quantitatively but still qualitatively. In order to compensate for the influences on the measurement signals of the second transducer occurring in the transmission of pressure surges via the housing or other parts of the sensor to the second transducer, the analysis software of the sensor in one embodiment may, therefore, comprise an algorithm, which includes a transmission characteristic curve associated with the second transducer and taken into account in the analysis of the second measurement signals for detecting pressure surges. The transmission characteristic curve can be a function which assigns a pressure course within the fluid line or the container into whose wall the sensor is integrated to a sequence of measurement signals. The transmission characteristic curve can be determined in preliminary experiments and stored in a memory of the sensor electronics. In this embodiment, the analysis software can be further configured to determine a pressure course within the fluid line or the container in whose wall the sensor is fixed on the basis of the transmission characteristic curve. The analysis software may further be configured to analyze this pressure course, e.g., to determine an intensity or a maximum of the pressure surge.

The sensor electronics and/or the higher-level data processing unit can comprise a pressure surge counter. The pressure surge counter may, for example, be configured to increase a stored pressure surge number by the value 1 after each detected pressure surge or to subtract the value 1 from a maximum permissible number of pressure surges after each detected pressure surge. The pressure surge counter can be implemented as software executable by the sensor electronics and/or the higher-level data processing unit.

The sensor electronics and/or the higher-level data processing unit can be designed, for example, to compare a respective current value of the mentioned pressure surge counter with a threshold value and to output a signal, such as an alarm when the threshold value is exceeded or fallen below. The threshold value may be set such that it indicates the permissible maximum number of pressure surges over the life or up to a maintenance threshold of the sensor. In this case, the signal can provide the information to a user that maintenance or replacement of the sensor is indicated. The threshold value or another threshold value may be set such that it indicates a maximum number of pressure surges, after which a servicing of the fluid line network, including the valves of the fluid line network, is required. In this case, the signal indicates to the user the need for maintenance of the fluid line network.

For sensor diagnosis of the inline sensor, the sensor electronics and/or the higher-level data processing unit can be configured to determine a state of the inline sensor on the basis of the second measurement signals, such as on the basis of a pressure surge number determined from the second measurement signals within a time span. For example, the sensor electronics and/or the higher-level data processing unit can be configured to determine a remaining service life of the inline sensor on the basis of the second measurement signals.

If the second transducer is a motion sensor, the sensor electronics may be configured to also analyze the measurement signals determined by the motion sensor that do not correspond to a pressure surge, i.e., do not lead to detecting a pressure surge, in order to predict a remaining life or a need for maintenance of the sensor. These measurement signals represent, for example, vibrations and/or oscillations of the housing, which can, similarly to pressure surges, lead to damage to the sensor. If the second transducer is a position sensor, the sensor electronics may be configured to also determine a change of the sensor orientation, e.g., with respect to the wall of the fluid line or of the container in which it is fixed.

In order to diagnose a fluid line system in which the inline sensor is installed, the sensor electronics and/or the higher-level data processing unit can be configured to determine a state of the fluid line system on the basis of the second measurement signals, such as on the basis of a pressure surge number determined from the second measurement signals during operation of the inline sensor.

The sensor electronics and/or the higher-level data processing unit can be configured to detect a change in the oscillation behavior of the fluid line in which the sensor is fixed based on the second measurement signals and to output a warning signal or a warning message when a change in the oscillation behavior is detected. A change in the oscillation behavior may result, for example, from mechanical damage to the fluid line system or a narrowing of the fluid line due to undesired deposits. Such effects can be detected and eliminated early by means of the analysis of the oscillation behavior described here.

The present disclosure also relates to a fluid line system having a plurality of fluid lines. The fluid line system includes an inline sensor according to one of the embodiments described herein integrated into at least one of the fluid lines. Automatically controllable actuators serve to control a transport of one or more fluids through the fluid lines. The fluid line system also includes a controller configured to control the actuators in order to transport the one or more fluids through the fluid lines. The controller is connected to the sensor electronics of the inline sensor or to a higher-level data processing unit connected to the sensor electronics of the inline sensor for communication.

The controller and/or the higher-level data processing unit may be configured to determine information about pressure surges occurring in the fluid line. The controller may further be configured to control the actuators based on the determined information such that a frequency and/or an intensity of pressure surges in the fluid line system is reduced. For this purpose, the controller can, for example, comprise a self-learning regulator designed to find those control parameters that cause a minimizing of the frequency and/or intensity of pressure surges in the fluid line network.

The fluid line system may include a plurality of fluid lines in each of which is arranged at least one inline sensor according to one of the embodiments described herein, the controller being connected to the inline sensors for communication. The inline sensors can have a sensor electronics which is connected directly to the controller for communication. Alternatively, individual or all inline sensors can be connected to a higher-level data processing unit for communication, which in turn is connected to the controller for communication. The controller can be configured to receive and process both measured values of the primary measurand and information about pressure surges registered by the inline sensors from the inline sensors or the higher-level data processing units. This information can include, for example, the time and an intensity of the pressure surges respectively registered by the inline sensors. The controller may be designed in this case to determine a distribution of the pressure surges from the received information and to optionally determine the originating location of the pressure surge.

BRIEF DESCRIPTION OF THE DRAWINGS

In the following, the present disclosure is described in more detail with reference to the exemplary embodiments shown in the figures. Shown are.

DETAILED DESCRIPTION

Figure 1:
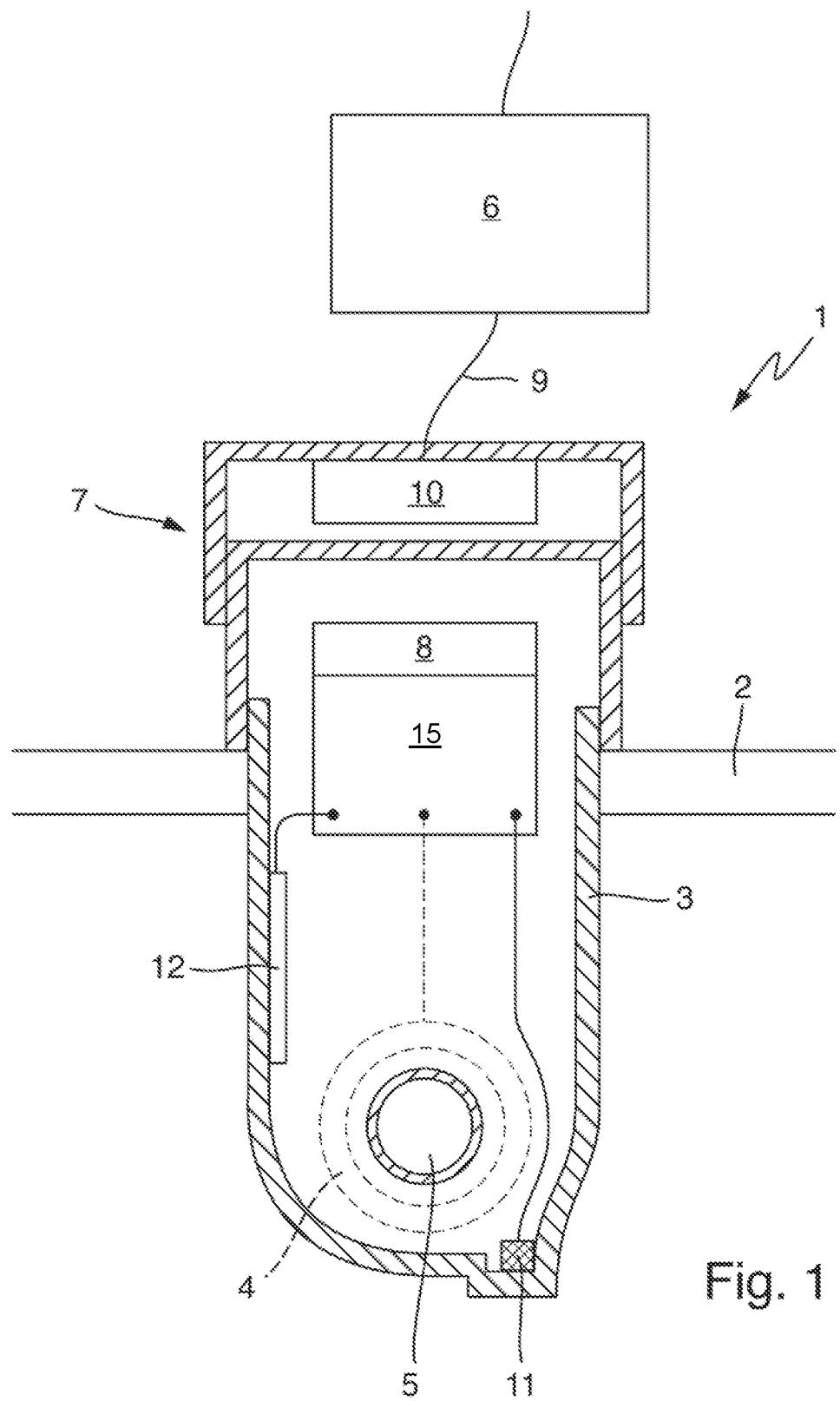
FIG. 1 shows an inductive conductivity sensor comprising an acceleration sensor and a strain gauge in order to detect pressure surges.

FIG. 1 schematically shows an inductive conductivity sensor 1 integrated into a wall 2 of a fluid line as a first example of an inline sensor. The conductivity sensor 1 has a substantially cylindrical, rod-shaped housing 3 made of an electrically insulating material, for example a plastic, such as PEEK, PVDF or PTFE. In the housing is a first transducer for detecting measured values of the conductivity of a fluid flowing in the fluid line, such as, in the present example a measuring liquid. The first transducer comprises two coaxial ring coils 4 arranged one behind the other, which are indicated only by dashed lines in FIG. 1 for the sake of clarity. The ring coils 4 surround a continuous opening 5 which is formed in the housing 3 and through which the measuring liquid flows. One of the ring coils 4 serves as a transmission coil; the other ring coil 4 serves as a receiving coil. Both ring coils 4 are connected to a sensor electronics 15 which is arranged in the housing 3 and which serves to generate measurement signals representing the conductivity of the measuring liquid, hereinafter referred to as conductivity measurement signals. In order to generate conductivity measurement signals, the sensor electronics 15 generates an alternating electromagnetic field by means of the transmission coil 4, said alternating field acting on charged particles in the measuring liquid and inducing a corresponding current flow in the measuring liquid. As a result of this current flow, an electromagnetic field is generated at the receiving coil 4, inducing an induction voltage in the receiving coil 4 according to Faraday's law of induction. This induction voltage is detected by the sensor electronics 15 and serves as a conductivity measurement signal. The sensor electronics 15 is designed to amplify and digitize the conductivity measurement signals.

The sensor electronics 15 can be connected to a higher-level data processing unit 6 for communication and for transmitting energy from the higher-level data processing unit 6 to the sensor electronics 15. In the present example, the connection is effected by means of an inductive plug-in connector coupling 7 which ensures galvanic isolation between the sensor electronics 15 and the higher-level data processing unit 6. The sensor electronics 15 comprises a communication interface 8 which serves as the primary side of the plug-in connector coupling 7. The higher-level data processing unit 6 is connected to a cable 9. The cable 9 has a communication interface 10 which is complementary to the communication interface 8 of the sensor circuit 15 and serves as the secondary side of the plug-in connector coupling 7.

Of course, the connection between the sensor electronics 15 and the higher-level data processing unit 6 can also be implemented inseparably by means of a fixed cable or separably by means of a plug-in connector coupling with conventional galvanic contacts. The higher-level data processing unit 6 may also be accommodated in a housing which is directly attachable on the primary side of the plug-in connector coupling 7 and additionally comprises the secondary side of the plug-in connector coupling 7. The higher-level data processing unit 6 and the sensor electronics 15 can also be combined in a single electronics housing directly in the housing 3. It is also possible for the higher-level data processing unit 6 and the sensor electronics 15 to communicate wirelessly with one another. The higher-level data processing unit 6 can be connected for communication to an operating device or to a controller, e.g., an SPS. It may comprise input and output means, e.g., a display designed as a touchscreen, and/or input keys or switches. The higher-level data processing unit 6 can be a measuring transducer.

In the present example, the sensor electronics 15 is configured to output the digitized conductivity measurement signals to the higher-level data processing unit 6. It can receive and process commands, parameters or software modules from the higher-level data processing unit 6. The higher-level data processing unit 6 is configured to process the conductivity measurement signals and to determine measured values of the conductivity from the conductivity measurement signals on the basis of a calibration function stored in a memory of the higher-level data processing unit 6 and to display them on a display and/or output them on an operating device or a controller.

In addition to the above-described conductivity measurement, the inline sensor 1 is configured to also detect and register pressure surges acting on the inline sensor 1. In the present example, the inline sensor 1 comprises an acceleration sensor 11 for this purpose. This acceleration sensor 11 is arranged on the front housing end, which projects into the fluid line. In the case of a pressure surge occurring in the fluid line, the rod-shaped housing 3 is set into oscillation. Oscillations are most noticeable at the front end of the housing 3; this position of the acceleration sensor 11 is therefore particularly favorable. The acceleration sensor 11 is arranged in the interior of the housing 3 and is thus protected from the measuring liquid flowing in the fluid line. In order to determine the housing oscillations caused by pressure surges, various embodiments of the acceleration sensor come into consideration, e.g., 3D acceleration sensors or piezoelectric acceleration sensors, including MEMS technology, or magnetically inductive acceleration sensors.

The acceleration sensor 11 is connected to the sensor electronics 15, which detects and processes measurement signals of the acceleration sensor 11 dependent on the acceleration experienced by the acceleration sensor 11. The sensor electronics 15 is configured to amplify and digitize the measurement signals of the acceleration sensor 11. It can also be configured to analyze the measurement signals in order to draw conclusions about a pressure surge acting on the sensor 1. In the present example, however, the sensor electronics 15 is not designed to further analyze the measurement signals but is configured to output the digitized measurement signals to the higher-level data processing unit 6.

The higher-level data processing unit 6 is configured to further process the measurement signals of the acceleration sensor 11. For this purpose, it comprises an analysis program which is executed by the higher-level data processing unit 6 in order to analyze the measurement signals. The higher-level data processing unit 6 can determine a course of the measurement signals of the acceleration sensor 11 in order to register a pressure surge. In case of a pressure surge, the course of the measurement signals has a sudden change, for example a sharp rise within a short time span. The higher-level data processing unit 6 can therefore monitor the change in the second measurement signals, e.g., in the form of a derivative of a course of the second measurement signals as a function of time. If the change in the second measurand within a predetermined time span or the derivation of the temporal course of the second measurement signals is greater than a predefined threshold value, the higher-level data processing unit 6 registers a pressure surge. On the basis of the magnitude of the derivative or based on a maximum of the course of the measurement signals, the higher-level data processing unit 6 can also determine an intensity of the pressure surge.

The higher-level data processing unit 6 may comprise a pressure surge counter formed in software. In an alternative embodiment, the pressure surge counter can also be comprised in the sensor electronics 15. For each registered pressure surge, the counter can be incremented by the value 1. In a memory of the higher-level data processing unit 6, one or more threshold values for the number of pressure surges experienced by the inline sensor 1 may be stored. A first threshold value can be selected, for example, such that the sensor should be serviced or replaced according to experience after such a number of pressure surges, since the probability of damage affecting the functionality of the sensor can no longer be guaranteed after this number of pressure surges. A second, lower threshold value can be predefined which serves as a warning threshold value. If the warning threshold value is exceeded, the higher-level data processing unit 6 can output a warning which informs a user that the sensor 1 should be replaced soon. On the basis of the reaching of the warning threshold value, the higher-level data processing unit 6 can also determine and output a remaining service life of the sensor 1. When the first threshold value is reached and exceeded, the higher-level data processing unit 6 can output an error message which informs the user that the sensor 1 now has to be replaced.

As an alternative to the acceleration sensor 11, the inline sensor 1 can also comprise a pressure sensor, a position sensor or a strain gauge for detecting pressure surges.

In the present example, in addition to the acceleration sensor 11, a strain gauge 12 is arranged by way of example on the inside of the housing wall of the housing 3. This strain gauge can be provided as an alternative to the acceleration sensor 11 or, as shown here, in addition to the acceleration sensor 11. It is connected to the sensor electronics 15 so that the sensor electronics 15 can detect and process measurement signals of the strain gauge 12. The sensor electronics 15 can output the processed measurement signals like the measurement signals of the acceleration sensor 11 to the higher-level data processing unit 6 for further analysis and for registration of pressure surges. In an alternative embodiment, the strain gauge 12 can also be mounted on an outside of the housing or be embedded, e.g., cast or insert-molded, in the housing wall.

When a pressure surge occurs in the fluid line, the rod-shaped housing is deformed and set into oscillations. Measurement signals of the strain gauge 12 can thus serve to detect pressure surges. For this purpose, the sensor electronics 6 can be designed to analyze a course of the measurement signals of the strain gauge 12 in a manner very analogous to how it was already described for the measurement signals of the motion sensor 11.

Figure 2:
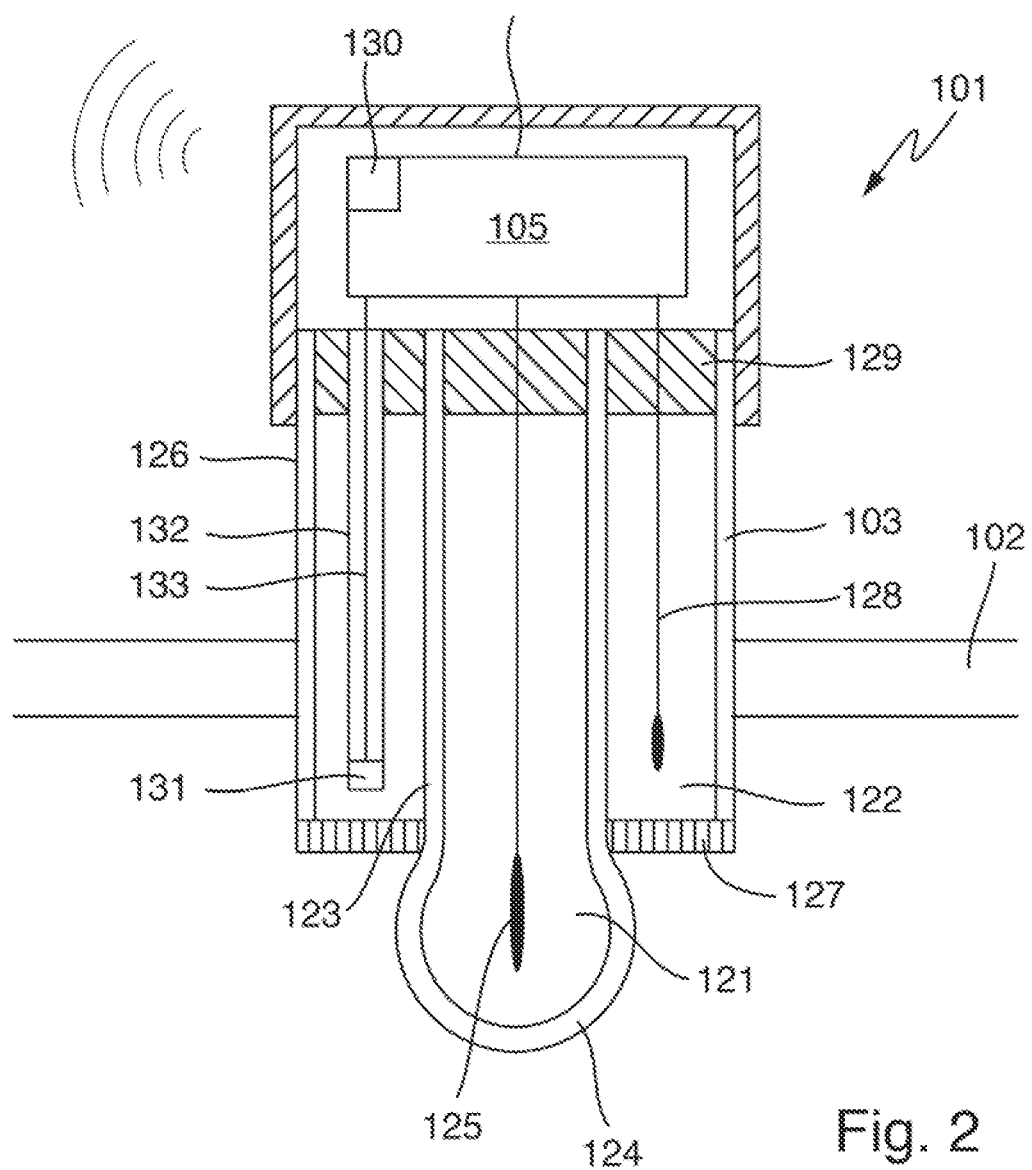
FIG. 2 shows a potentiometric pH sensor with a reference half-cell into which a pressure sensor serving to detect pressure surges is integrated.

FIG. 2 schematically illustrates another exemplary embodiment of an inline sensor 101 for measuring a first measurand, which sensor 101 is additionally designed to detect pressure surges. In the exemplary embodiment shown here, the inline sensor 101 is designed as a potentiometric pH sensor. It has a substantially cylindrical, rod-shaped housing 103 made of an insulating material, e.g., glass, and integrated into a wall 102 of a fluid line. The housing 103 comprises two separate chambers 121, 122 each forming a half-cell of the potentiometric pH sensor. The chamber 121 forming the measuring half-cell has a first tubular housing part 123 which is closed by a pH-sensitive glass membrane 124 at its front end, which is intended for contact with a measuring fluid flowing in the fluid line. The chamber 121 is, for example, sealed on the rear side by a casting compound 129 in a liquid-tight manner. Within the chamber 121 is contained an internal electrolyte, e.g., a buffered potassium chloride solution, which may be thickened by a polymer. The internal electrolyte is contacted by an electrically conductive discharge element 125. In the present example, the discharge element 125 is made of a silver wire having a silver chloride coating. The silver wire is led out of the chamber 121 on the rear side.

The chamber 122 forming the reference half-cell is formed by another tubular housing part 126 extending coaxially around the tubular housing part 123 as an annular chamber enclosed between the tubular housing parts 123, 126. On the front side, the chamber 122 is closed by a porous ceramic diaphragm 127 extending annularly around the measuring half-cell. The ceramic diaphragm 127 serves as a transfer for establishing an electrolytic contact between a reference electrolyte accommodated in the chamber 122 and the measuring fluid. In alternative embodiments of the pH sensor, such a contact can also be established by means of a gap, an outflow juncture or another opening in the wall of chamber 122 instead of by a diaphragm. The reference electrolyte in the present example is a highly concentrated potassium chloride solution which may optionally be thickened by means of a polymer. A reference element 128 contacting the reference electrolyte is moreover arranged in the chamber 122. In the present example, this reference element is formed like the discharge element 125 from a silver wire coated with silver chloride. On the rear side, the reference element 128 is led out of the chamber 122, which at its rear end is sealed by means of a casting compound 129 in a liquid-tight manner.

The discharge element 125 and the reference element 128 are electrically conductively connected to a sensor electronics 105. The sensor electronics 105 is arranged in an electronic chamber formed in the housing 103 and separated from the electrolyte-filled chambers 121, 122. The sensor electronics 105 is designed to detect a pH-dependent voltage which forms between the half-cells in contact of the half cells with the measuring fluid. To this end, it detects the voltage between the discharge element 125 and the reference element 128. This voltage serves as a measurement signal representing the pH value of the measuring fluid.

In the present example, the sensor electronics 105 can be connected via a cable to a higher-level data processing unit. This connection and the corresponding communication interfaces can be designed in a very analogous manner to how it was described above with reference to FIG. 1 for the sensor electronics 15 of the conductivity sensor illustrated in FIG. 1. The sensor electronics 105 further comprises a communication interface 130 for communication by radio with an operating device, for example according to a Bluetooth standard, such as IEEE 802.15.1. version 4.0, a wireless HART standard, such as IEEE 802.15.4, or a wireless LAN standard, such as a standard of the IEEE 802.11 family.

The sensor electronics 105 may be configured to amplify and/or digitize the detected measurement signals and to output the amplified or digitized measurement signals via one or all communication interfaces. It may also be configured to determine measured values of the pH value from the measurement signals, e.g., on the basis of a calibration function. The calibration function can, for example, be a straight line, the parameters of which, zero point and slope, may be stored in a memory of the sensor electronics 105. Alternatively, higher-level units, for example a higher-level electronics connected via cables to the sensor electronics 105 or an operating device communicating with the sensor electronics 105 via radio, can be configured to determine the measured values from the measurement signals.

In order to detect pressure surges in the fluid line, the inline sensor 101 comprises an additional pressure sensor 131 which, in the example shown here, is arranged in the chamber 122 forming the reference half-cell. The pressure sensor 131 is arranged at a front end of a capillary 132 consisting of an electrically insulating material, e.g., glass. Electrical lines 133 which contact the pressure sensor 131 and are connected to the sensor electronics 105 are guided in the capillary 132. Since the diaphragm 127 has a plurality of pores, the interior of the chamber 122 communicates with the interior of the fluid line so that pressure surges in the fluid line are also detectable in the interior of the chamber 122 by the pressure sensor 131. The pressure sensor 131 is advantageously arranged close to the diaphragm 127 in order to ensure good transmission of the pressure surges to the pressure sensor 131. The pressure sensor 131 can be designed in a known manner, for example as a capacitive, piezoresistive, piezoelectric or inductive pressure sensor.

The sensor electronics 105 is designed to detect and optionally process, for example, amplify and/or digitize, the measurement signals of pressure sensor 131. Very analogously to how it was described with reference to the conductivity sensor with acceleration sensor shown in FIG. 1, the sensor electronics 105 itself can determine from the course of the measurement signals of the pressure sensor when a pressure surge is present. Alternatively, it may output the measurement signals to a higher-level unit, e.g., the higher-level data processing unit or the higher-level operating device. In this case, the higher-level unit is designed to evaluate the course of the pressure measurement signals and to conclude the presence of a pressure surge on the basis of the course, for example when a considerable change in the pressure signals occurs within a predetermined short time span.

Figure 3:
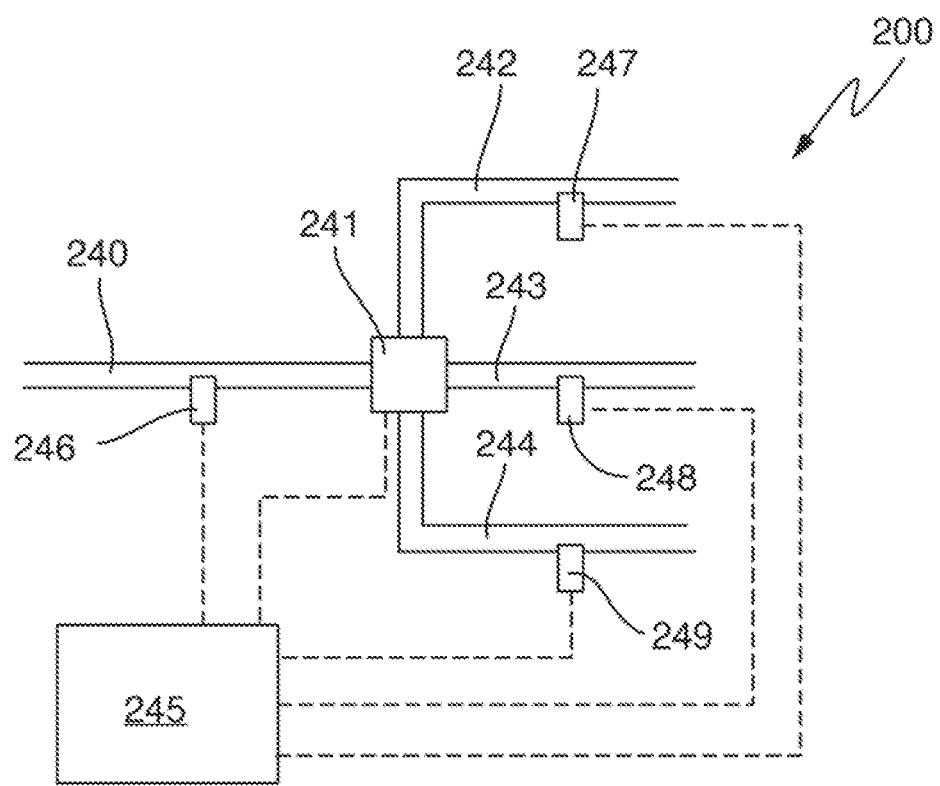
FIG. 3 shows a detail from a fluid line network with a valve and an analysis sensor integrated into a fluid line with an integrated pressure sensor for detecting pressure surges.

Schematically shown in FIG. 3 is a detail of a fluid line system 200. It may, for example, be part of a process plant or a fluid network, e.g., a waste water or drinking water network. The fluid line system 200 comprises a first fluid line 240, which can be connected via a manifold valve 241 to a second fluid line 242, a third fluid line 243, and a fourth fluid 244. The valve 241 is actuated by one or more actuators (not shown). These actuators can be automatically actuated by a controller 245.

Arranged in the fluid line network 200 are moreover a plurality of inline sensors 246, 247, 248 and 249, which are configured to detect pressure surges occurring in the fluid lines 240, 242, 243 and 244 in addition to measured values of a primary measurand, such as flow, temperature or an analysis measurand. For this purpose, in addition to a first transducer for detecting the primary measurand, the inline sensors 246, 247, 248, 249 have a second transducer which generates measurement signals which are influenced by a pressure surge occurring in the fluid lines 240, 242, 243 and 244. Such transducers can, for example, be acceleration sensors, position sensors or pressure sensors as described above.

The inline sensors 246, 247, 248 and 249 are connected to the controller 245 via a higher-level data processing unit (not shown in addition here). The sensors 246, 247, 248 and 249 are accordingly configured to communicate with the higher-level data processing unit, while the higher-level data processing unit is additionally designed to communicate with the controller 245. The inline sensors 246, 247, 248 and 249 are designed to output the measurement signals of the first and second transducers or measurement signals derived therefrom to the higher-level data processing unit. The higher-level data processing unit is designed to determine measured values of the primary measurand from the measurement signals of the first transducer and to determine the occurrence of a pressure surge from the measurement signals of the second transducer. The determination can be derived from the temporal course of the measurement signals as described above.

If the higher-level data processing unit determines the presence of a pressure surge, it registers this pressure surge together with a time of detecting the pressure surge and optionally an intensity of the pressure surge derived from the course of the measurement signals. The intensity may, for example, correspond to a deflection of the measurement signal, i.e., a difference between a maximum value of the measurement signal and a minimum value or a baseline of the measurement signal course. The measurement signal course can optionally be converted by means of a stored transmission characteristic curve of the sensor into a pressure course within the fluid line in which the sensor is installed. In this case, the intensity of the pressure surge can be determined from the deflection of the pressure course. The higher-level data processing units of the inline sensors 246, 24, 248, 249 output registered pressure surges with the time of detection of the pressure surge by the respective inline sensor and optionally the intensity of the pressure surge to the controller 245.

In a variation of the embodiment described here, the sensors 246, 247, 248 and 249 are directly connected to the controller 245. In this case, the sensor electronics itself is designed to determine measured values of the primary measurand from the measurement signals of the first transducer and to determine the occurrence of a pressure surge as well as the time of the pressure surge and optionally its intensity based on the measurement signals of the second transducer. The sensor electronics of the sensors 246, 247, 248 and 249 is further designed in this embodiment to output the measured values and the information about registered pressure surges to the controller 245 for further processing.

The controller 245 may use this information provided by the higher-level data processing units of the inline sensors 246, 247, 248 and 249 to regulate the transport of fluids through the fluid line network 200. For example, it may adapt the control of actuators of the fluid line system 200, e.g., of the actuator actuating the valve 241, in such a way that the frequency or the intensity of the pressure surges is reduced. This can be achieved, for example, by a less frequent or slower actuation of the valve 241 or by an actuation of the valve 241 coordinated with the actuation of other valves of the fluid line system. The controller 245 may comprise operating software that is executable by the controller 245 and provides a self-learning function by means of which the controller 245 may minimize actuation of valves of the fluid line system 200 with the objective of reducing the frequency and/or intensity of pressure surges.

The controller 245 may further be designed to diagnose the fluid line system 200. For this purpose, it can comprise diagnostic software that can be executed by the controller 245 and serves to carry out a diagnostic method. This method can include determination of a spatial and temporal distribution of the registration of pressure surges by the individual sensors 246, 247, 248, and 249 distributed in the fluid line network. From the determined spatial and temporal distribution, the controller 245 may determine the origin of the pressure surge. This information may be provided for maintenance measures. In addition, this information can also be used for regulating the transport of fluids through the fluid line system 200 in order to optimize operation with the aim of minimizing pressure surges.

The invention claimed is:

1. An inline sensor comprising:
a housing fixable in a wall of a fluid line or a container;
a first transducer for detecting a primary measurand of a medium contained in the fluid line or the container, wherein the first transducer is integrated into the housing and designed to generate first measurement signals dependent on the primary measurand; and
a sensor electronics connected to the first transducer for detecting the first measurement signals and designed to process the first measurement signals;
wherein the inline sensor is additionally designed to detect pressure surges occurring in the fluid line or the container,
wherein the inline sensor for detecting pressure surges comprises a second measuring transducer for detecting a secondary measurand, wherein the second transducer is integrated into the housing and is designed to generate second measurement signals dependent on the secondary measurand, where a pressure change acting on the housing influences the secondary measurand,
wherein the sensor electronics is connected to a higher-level data processing unit in a wireless or wired manner for communication, the sensor electronics being designed to communicate with the higher-level data processing unit, and
wherein the sensor electronics and/or the higher-level data processing unit is configured to analyze a set course of the second measurement signals in order to detect a pressure surge based on a predefined threshold value stored therein.

2. The inline sensor of claim 1, wherein the second transducer is a pressure sensor, an acceleration sensor, a strain gauge, a position senssor, or a magnetometer.

3. The inline sensor of claim 1, wherein the second transducer is a MEMS pressure sensor or a MEMS acceleration sensor.

4. The inline sensor of claim 1, wherein the sensor electronics is connected to the second measuring transducer for detecting the second measurement signals and is designed to process the second measurement signals.

5. The inline sensor of claim 1, wherein the primary measurand is an analysis measurand of a measuring fluid contained in the fluid line or the container, a mass or volume flow of the measuring fluid through the fluid line or the container, a temperature of the measuring fluid in the fluid line or the container, or a fill level of the measuring fluid in the fluid line or the container.

6. The inline sensor of claim 1, wherein the sensor electronics and/or the higher-level data processing unit comprises a pressure surge counter.

7. The inline sensor according of claim 6, wherein the sensor electronics and/or the higher-level data processing unit is further designed to compare a value of the pressure surge counter with a threshold value and to output a signal when the threshold value is exceeded or fallen below.

8. The inline sensor of claim 1, wherein the sensor electronics and/or the higher-level data processing unit is configured to determine a state of the inline sensor on the basis of the second measurement signals.

9. The inline sensor of claim 8, wherein the sensor electronics and/or the higher-level data processing unit is configured to determine a remaining service life of the inline sensor on the basis of the second measurement signals.

10. The inline sensor of claim 1, wherein the sensor electronics and/or the higher-level data processing unit is configured to determine a state of a fluid line system in which the inline sensor is installed on the basis of the second measurement signals.

11. The inline sensor of claim 1, wherein the sensor electronics and/or the higher-level data processing unit is configured to detect a change in the oscillation behavior of the fluid line in which the sensor is fixed on the basis of the second measurement signals and to output a warning signal or a warning message when a change in the oscillation behavior is detected.

12. A fluid line system comprising:
a plurality of fluid lines;
an inline sensor integrated into at least one of the fluid lines, the inline sensor including: a housing fixable in a wall of a fluid line or a container; a first transducer for detecting a primary measurand of a medium contained in the fluid line or the container; wherein the first transducer is integrated into the housing and designed to generate first measurement signals dependent on the primary measurand; and a sensor electronics connected to the first transducer for detecting the first measurement signals and designed to process the first measurement signals; wherein the inline sensor is additionally designed to detect pressure surges occurring in the fluid line or the container,
wherein the inline sensor for detecting pressure surges comprises a second measuring transducer for detecting a secondary measurand, wherein the second transducer is integrated into the housing and is designed to generate second measurement signals dependent on the secondary measurand, where a pressure change acting on the housing influences the secondary measurand,
wherein the sensor electronics is connected to a higher-level data processing unit in a wireless or wired manner for communication, the sensor electronics being designed to communicate with the higher-level data processing unit, and
wherein the sensor electronics and/or the higher-level data processing unit is configured to analyze a course of the second measurement signals in order to detect a pressure surge based on a predefined threshold value stored therein;
automatically controllable actuators that serve to control a transport of one or more fluids through the fluid lines; and
a controller configured to control the actuators in order to transport the one or more fluids through the fluid lines;
wherein the controller is connected to the sensor electronics of the inline sensor or to the higher-level data processing unit connected to the sensor electronics of the inline sensor for communication.

13. The fluid line system of claim 12, wherein the controller and/or the higher-level data processing unit is configured to determine information about pressure surges occurring in the fluid line, and wherein the controller is further configured to control the actuators on the basis of the determined information in such a way that a frequency and/or an intensity of pressure surges in the fluid line system is reduced.

* * * * *